United States Patent
Gonzalez (10) Patent No.: US 8,132,208 B2
(45) Date of Patent: Mar. 6, 2012

(54) PRESENTING A TELEVISION SERVICES PROGRAM GUIDE INFORMATION AS A VIDEO MOSAIC

(75) Inventor: Francisco Gonzalez, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 274 days.

(21) Appl. No.: 11/704,696

(22) Filed: Feb. 9, 2007

(65) Prior Publication Data

US 2007/0204297 A1    Aug. 30, 2007

Related U.S. Application Data

(60) Provisional application No. 60/772,151, filed on Feb. 10, 2006.

(51) Int. Cl.
 *H04N 5/455* (2006.01)
(52) U.S. Cl. ............................. 725/46; 725/41
(58) Field of Classification Search .................... 725/39, 725/40, 41, 44, 45, 46, 47, 52
See application file for complete search history.

(56) References Cited

U.S. PATENT DOCUMENTS

| | | | |
|---|---|---|---|
| 6,147,714 A * | 11/2000 | Terasawa et al. | 348/564 |
| 7,089,577 B1 * | 8/2006 | Rakib et al. | 725/87 |
| 7,174,512 B2 * | 2/2007 | Martin et al. | 715/719 |
| 2005/0138658 A1 * | 6/2005 | Bryan | 725/46 |
| 2005/0228806 A1 * | 10/2005 | Haberman | 707/100 |
| 2006/0039481 A1 * | 2/2006 | Shen et al. | 375/240.25 |
| 2006/0150216 A1 * | 7/2006 | Herz et al. | 725/50 |

* cited by examiner

*Primary Examiner* — Andrew Koenig
*Assistant Examiner* — Aklil Tesfaye
(74) *Attorney, Agent, or Firm* — Merchant & Gould (57) ABSTRACT

Methods and computer-readable media are provided for presenting program guide information using a mosaic of video sources broadcast in a television services system. An application program executed on a television services set-top box generates a matrix of still images representing multiple video sources presently being broadcast in the television services system. The matrix of still images is presented as a video mosaic representing current program guide information in the television services system.

20 Claims, 4 Drawing Sheets

PRESENTING A TELEVISION SERVICES PROGRAM GUIDE INFORMATION AS A VIDEO MOSAIC

CROSS-REFERENCE TO RELATED APPLICATIONS

The present application claims priority to U.S. Provisional Application No. 60/772,151, filed Feb. 10, 2006, entitled "Methods and Computer-Readable Media For Presenting Program Guide Information As A Video Mosaic In A Television Services System."

BACKGROUND OF THE INVENTION

With the advent of modern television services networks, such as cable and satellite systems, subscribers have grown accustomed to receiving a variety of television programming from numerous broadcasting sources. In recent years, technology advances have enabled subscribers to receive an even greater variety of products and services through television services networks. For example, modern cable services networks provide traditional video television programming, telephone services, high speed Internet access, electronic mail services, video-on-demand, information services, and the like. Through the use of set-top boxes (computing systems), cable and satellite television services providers can provide interactive television services to subscribers. Such interactive television services allow customers to interact directly with service providers in response to services and product offerings presented to the subscribers through their television sets.

Recently, many television services providers are beginning to offer dedicated "mosaic" channels in which live feeds of multiple programming are broadcast on a single video channel on the provider's networks. Currently, mosaic channels display a scaled down "windows" of currently broadcasting programs selected by the provider in one or more categories (i.e., news, sports, etc.) also selected by the provider, along with non-program based audio from a live host or background music.

Current mosaics, however, suffer from a number of drawbacks. One drawback is that the content of each mosaic is determined by the service provider. Thus, subscribers have no control over the programs which make up a particular mosaic channel. Moreover, the content selected by the service provider may not be of interest to some subscribers. Another drawback of current mosaics is that each one takes up an entire video channel in a service provider's channel lineup, leaving fewer channels for providing regular full screen programming. It is with respect to these and other considerations that the present invention has been made.

BRIEF SUMMARY OF THE INVENTION

In accordance with the present invention, the above and other problems are solved by methods and computer-readable media for presenting program guide information using a mosaic of video sources broadcast in a television services system. According to one aspect of the invention, a method includes generating a matrix of still images representing multiple video sources (e.g., channels) presently being broadcast in the television services system and presenting the matrix of still images as current program guide information in the television services system.

According to other aspects of the invention, the method may be implemented by a set-top box in the television services system having one or multiple tuners. In a set-top box having one tuner, the matrix of still images may be generated from a currently tuned channel during an idle state for the tuner, such as when the tuner is off or when the tuner is generating a graphics screen (e.g., an electronic program guide). In a set-top box having multiple tuners, the matrix of still images may be generated regardless of the currently tuned channel by downloading video windows representing the still images over an extended data channel in the television services system. The matrix may also be generated according to a user-defined filter in which the images meet one or more user-defined criteria.

Other aspects of the invention may be implemented as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Figure 1:
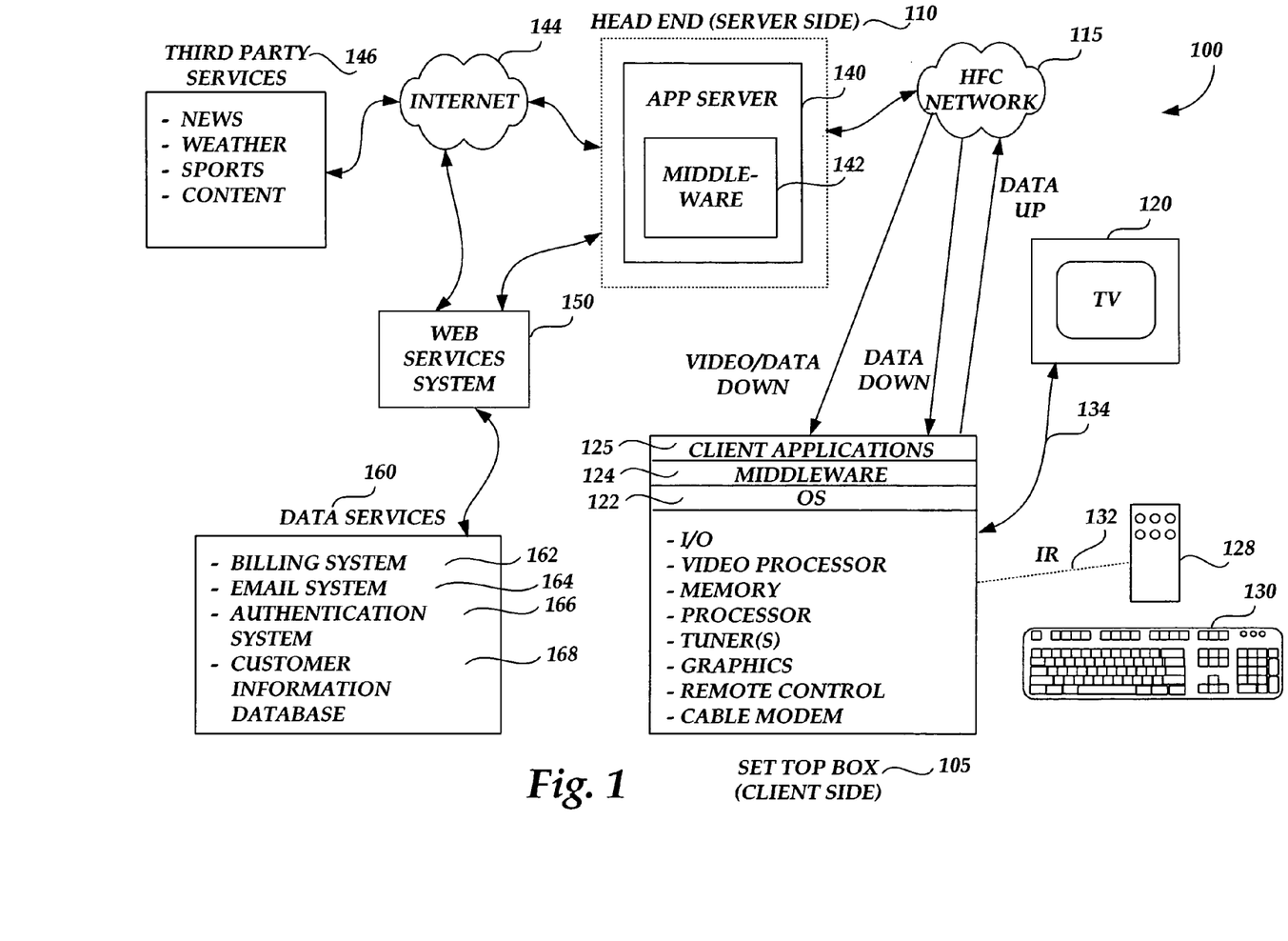
FIG. 1 is a network diagram illustrating a cable services network architecture that serves as an illustrative operating environment for the present invention.

Embodiments of the present invention may be implemented in a number of distributed computing environments where functionality is tailored for provision to a given user based on a user profile obtained by polling data sources having data associated with the user. According to an actual embodiment, the present invention is implemented in a cable television/services system. FIG. 1 is a simplified block diagram illustrating a cable television/services system (hereafter referred to as "CATV") architecture that serves as an exemplary operating environment for the present invention.

Referring now to FIG. 1, digital and analog video programming, information content and interactive television services are provided via a hybrid fiber coax (HFC) network 115 to a television set 120 for consumption by a cable television/services system customer. As is known to those skilled in the art, HFC networks 115 combine both optical fiber and coaxial cable lines. Typically, optical fiber runs from the cable head end 110 to neighborhoods of 500 to 2,000 customers. Coaxial cable runs from the optical fiber feeders to each customer.

According to embodiments of the present invention, the functionality of the HFC network 115 allows for efficient bidirectional data flow between the client-side set-top box 105 and the server-side application server 140 of the present invention.

According to embodiments of the present invention, the CATV system 100 is in the form of a distributed client-server computing system for providing video and data flow across the HFC network 115 between server-side services providers (e.g., cable television/services providers) via a server-side head end 110 and a client-side customer via a client-side set-top box (set-top box) functionally connected to a customer receiving device, such as the television set 120. As is understood by those skilled in the art, modern CATV systems may provide a variety of services across the HFC network 115 including traditional digital and analog video programming, telephone services, high speed Internet access, video-on-demand, and information services.

On the client side of the CATV system 100, digital and analog video programming and digital and analog data are provided to the customer television set 120 via the set-top box 105. Interactive television services that allow a customer to input data to the CATV system 100 likewise are provided by the set-top box 105. As illustrated in FIG. 1, the set-top box 105 is a multipurpose computing device having a computer processor, memory and an input/output mechanism. The input/output mechanism receives input from server-side processes via the HFC network 115 and from customers via input devices such as the remote control device 128 and the keyboard 130. The remote control device 128 and the keyboard 130 may communicate with the set-top box 105 via a suitable communication transport such as the infrared connection 132. The set-top box 105 also includes a video processor for processing and providing digital and analog video signaling to the television set 120 via a cable communication transport 134. One or more multi-channel tuners are provided for processing video and data to and from the set-top box 105 and the server-side head end system 110, described below. The set-top box 105 may optionally include an embedded cable modem for communicating data with the head end 110 through the HFC network 115. In an alternative embodiment of the invention, the set-top box 105 may also be a "tunerless" set-top box, such as an Internet Protocol Television ("IPTV") set-top box, connected to a cable or digital subscriber line ("DSL") modem via an Ethernet connection, which is in communication with the head end 100 via the HFC network 115.

It will be appreciated by those skilled in the art that the head end 110 may also provide the cable modem with access to the Internet 144 through a cable modem termination system (not shown). Those skilled in the art will understand that according to one embodiment, the embedded cable modem may be implemented in accordance with the Data Over Cable Service Interface Specification ("DOCSIS") developed by Cable Television Laboratories, Inc. (CABLELABS) of Louisville, Colo.

The set-top box 105 passes digital and analog video and data signaling to the television 120 via a one-way communication transport 134. The set-top box 105 may receive video and data from the server side of the CATV system 100 via the HFC network 115 through a video/data downlink and data via a data downlink. The set-top box 105 may transmit data from the client side of the CATV system 100 to the server side of the CATV system 100 via the HFC network 115 via one data uplink. The video/data downlink is an "in band" downlink that allows for digital and analog video and data signaling from the server side of the CATV system 100 through the HFC network 115 to the set-top box 105 for use by the set-top box 105 and for distribution to the television set 120. As is understood by those skilled in the art, "in band" refers to data streams that are in the same frequency channel as the program being tuned. "In band" data may be acquired while tuned to the same frequency as the program video. For example, ancillary data in vertical blanking interval ("VBI") or Moving Picture Experts Group ("MPEG") transport data tables are well-known forms of "in band" data.

The data downlink and the data uplink, illustrated in FIG. 1, between the HFC network 115 and the set-top box 105 comprise "out of band" data links. As is understood by those skilled in the art, "out of band" refers to data streams that are present regardless of a video tuner frequency. "Out of band" data utilizes downstream Quadrature Phase-Shift Keying ("QPSK") carriers in the 75 to 77 MHz frequency range and upstream carriers in the 5 to 42 MHz frequency range. According to embodiments of the present invention, data flow between the client-side set-top box 105 and the server-side application server 140 is typically passed through the "out of band" data links. Alternatively, an "in band" data carousel may be positioned in an "in band" channel into which a data feed may be processed from the server-side application server 140 through the HFC network 115 to the client-side set-top box 105. Operation of data transport between components of the CATV system 100, described with reference to FIG. 1, is well known to those skilled in the art.

According to various embodiments of the invention, the cable modem may utilize the "out of band" data downlink as an extended or logical data channel. The extended data channel may be divided into smaller channels for providing conditional access to a wide area network (i.e., the Internet) and downloading application data including electronic program guide ("EPG") data and video data as decimated images or video stills from the application server 140 in the head end 110 for creating a video mosaic. As will be discussed in greater detail below with respect to FIGS. 2-4, the decimated images may represent snapshots of video programs being currently broadcast in the CATV system 100.

The set-top box 105 also includes an operating system 122 for directing the functions of the set-top box 105 in conjunction with a variety of client applications 125 which, as will be described in greater detail below, may include a mosaic application program for taking snapshots to create still images of incoming video data representing multiple channels currently being broadcast in the CATV system 100, decimating the still images into smaller ages or video windows, and composing the video windows into an n×m matrix of images to create a video mosaic, according to one embodiment of the invention. Because a variety of different operating systems 122 may be utilized by a variety of different brands and types of set-top boxes, a middleware layer 124 is provided to allow a given software application to be executed by a variety of different operating systems.

Those skilled in the art will understand that in one embodiment of the invention, the middleware layer 124 may be implemented according to the OpenCable Access Platform ("OCAP") specification developed by Cable Television Laboratories, Inc. (CABLELABS) of Louisville, Colo. In accordance with the OCAP specification, the middleware layer 124 creates a common platform upon which interactive services may be deployed independent of set-top box hardware or operating system software choices implemented by a particular service provider. As described below, a corresponding middleware layer 142 is included on the server side of the CATV system 100 for facilitating communication between the server-side application server 140 and the client-side set-top box 105.

Referring still to FIG. 1, the head end 110 of the CATV system 100 is positioned on the server side of the CATV system and includes hardware and software systems responsible for originating and managing content for distributing through the HFC network 115 to one or more client-side set-top boxes 105 for presentation to customers via televisions 120. As described above, a number of services may be provided by the CATV system 100, including digital and analog video programming, interactive television services, Internet access, telephone services, video-on-demand ("VOD") services, targeted advertising, and provision of information content. As discussed in greater detail below, according to the various embodiments of the present invention, the CATV system 100 may also provide a "video mosaic" service in which a matrix of video stills of programming currently being broadcast on multiple channels is displayed to a user as program guide information.

The application server 140 is a general-purpose computing system operative to assemble and manage data sent to and received from the client-side set-top box 105 via the HFC network 115. As described above with reference to the set-top box 105, the application server 140 includes a middleware layer 142 for processing and preparing data from the head end of the CATV system 100 for receipt and use by the client-side set-top box 105. For example, the application server 140 via the middleware layer 142 may obtain data from third-party services 146 via the Internet 140 for transmitting to a customer through the HFC network 115 and the set-top box 105. According to one embodiment of the invention, the application server 140 may be configured to extract video data from the head end 110 and generate a customized video mosaic of still images representing various television programs broadcast in the CATV system 100 for transmission to the set-top box 105 over an extended data channel.

According to embodiments of the invention, the application server 140 may also be utilized to obtain customer profile data from services provider data services 160 for preparing a customer profile that may be utilized by the set-top box 105 for tailoring certain content provided to the customer. As illustrated in FIG. 1, the services provider data services 160 include a number of services operated by the services provider of the CATV system 100 which may include data on a given customer. For example, a billing system 162 may include information such as a customer's name, street address, business identification number, Social Security number, credit history, and information regarding services and products subscribed to by the customer. An electronic mail system 164 may contain information such as electronic mail addresses, high-speed Internet access subscription information and electronic mail ("e-mail") usage data. An authentication system 166 may include information such as secure user names and passwords utilized by customers for access to network services.

The subscriber information database 168 may include general information about customers such as place of employment, business address, business telephone number and demographic information such as age, gender, educational level, and the like as well as information about subscribed services such as whether or not a customer has high-speed Internet access, an e-mail account, and premium programming access. In addition to the aforementioned services and in accordance with the various embodiments of the present invention, the subscriber information database 168 may also include information as to whether or not a customer subscribes to the video mosaic service briefly described above and which will be described in greater detail below. As should be understood by those skilled in the art, the disparate data services systems 162, 164, 166, 168 are illustrated as a collection of data services for purposes of example only. The example data services systems comprising the data services 160 may operate as separate data services systems, which communicate with a web services system (described below) along a number of different communication paths and according to a number of different communication protocols.

Referring still to FIG. 1, a web services system 150 is illustrated between the application server 140 and the data services 160. According to embodiments of the present invention, the web services system 150 serves as a collection point for data requested from each of the disparate data services systems comprising the data services 160. When the application server 140 requires customer profile data from one or more of the data services 160 for preparation or update of a customer profile, the application server 140 passes a data query to the web services system 150. The web services system formulates a data query to each of the available data services systems for obtaining any available data for a given customer as identified by a set-top box identification associated with the customer. The web services system 150 serves as an abstraction layer between the various data services systems and the application server 140. That is, the application server 140 is not required to communicate with the disparate data services systems, nor is the application server 140 required to understand the data structures or data types utilized by the disparate data services systems. The web services system 150 is operative to communicate with each of the disparate data services systems for obtaining necessary customer profile data. The customer profile data obtained by the web services system is assembled and is returned to the application server 140 for ultimate processing via the middleware layer 142, as described above.

Figure 2:
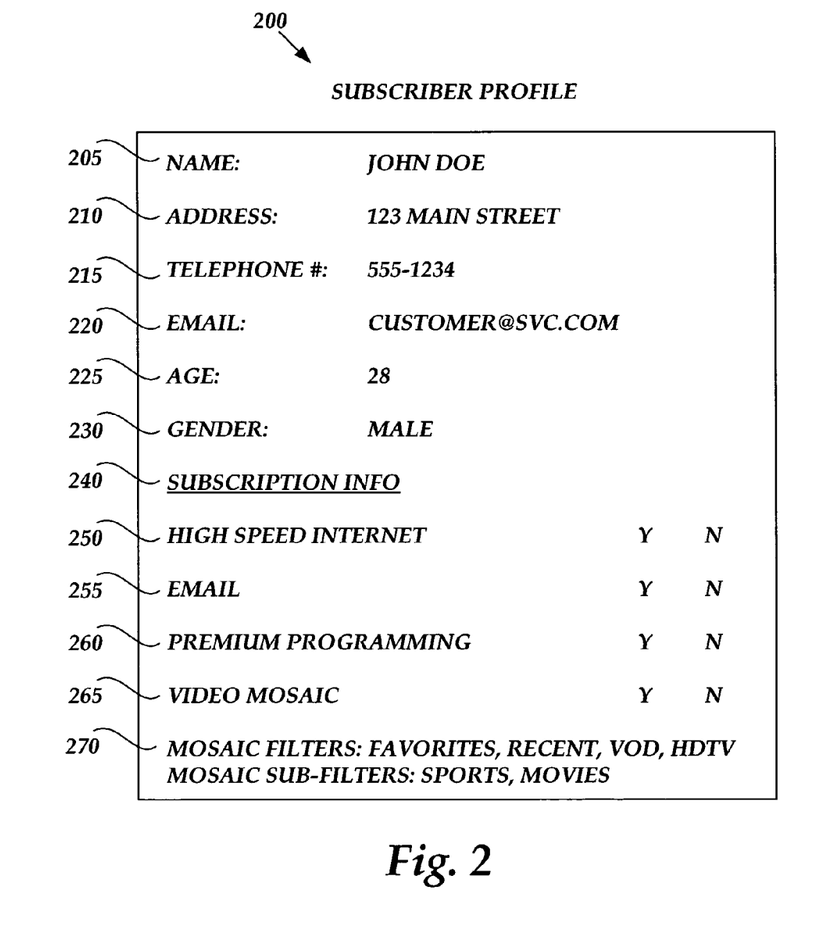
FIG. 2 is a simplified block diagram illustrating a customer profile data structure for providing customer profile data to a set-top box according to an embodiment of the present invention.

Having described an exemplary operating environment for embodiments of the present invention with reference to FIG. 1, preparation and utilization of a customer profile will now be described. FIG. 2 is a simplified block diagram illustrating a customer profile data structure for providing customer profile data to a set-top box according to embodiments of the present invention. As described above, once the web services system 150 assembles required customer data, the customer data is passed back to the application server 140 where a customer profile 200 is prepared for transmission to the client-side set-top box 105 via the HFC network 115. The customer profile 200, illustrated in FIG. 2, is for purposes of example only. As should be appreciated by those skilled in the art, the customer profile may contain a variety of different types of information about a given customer that may be useful for targeted advertising and targeted content provision for the customer via the set-top box 105.

Referring to the customer profile 200, information gathered by the web services system 150 from one or more of the data services systems 160 is assembled into a data structure for provisioning the set-top box 105. As illustrated in FIG. 2, a name 205, address 210, telephone number 215, email address 220, age 225 and gender 230 for a given customer have been obtained and have been populated into the customer profile 200. As described above, such information may be gathered from any number of data services systems such as the billing system 162, the email system 164, the authentication system 166, or the customer information database 168. Additionally, following from the example customer profile 200, illustrated in FIG. 2, subscription information 240 for the associated customer has been obtained and has been populated into the customer profile. For example, information regarding services or products subscribed to by the customer is provided such as high-speed Internet subscription 250, email subscription 255, premium programming subscription 260, telephone customer services 265, or video mosaic service 265. With respect to the video mosaic service 265, the subscription information 240 may also include customer preferences regarding which channels will be represented in the mosaic. For example, mosaic filters 275 may be used to specify "filters" for determining channels for the mosaic such as, for example, customer specified Favorites (i.e., favorite channels), Recent (i.e., recently viewed) channels, VOD channels, and high definition television ("HDTV") channels. The mosaic filter 275 may also specify "sub-filters" for main filter channel selections, such as sports and movies genres. Once the customer profile 200 is prepared by the application server 140, the customer profile may be formatted according to a formatting language such as the Extensible Markup Language and may be transmitted to the set-top box 105, as described herein.

Figure 3:
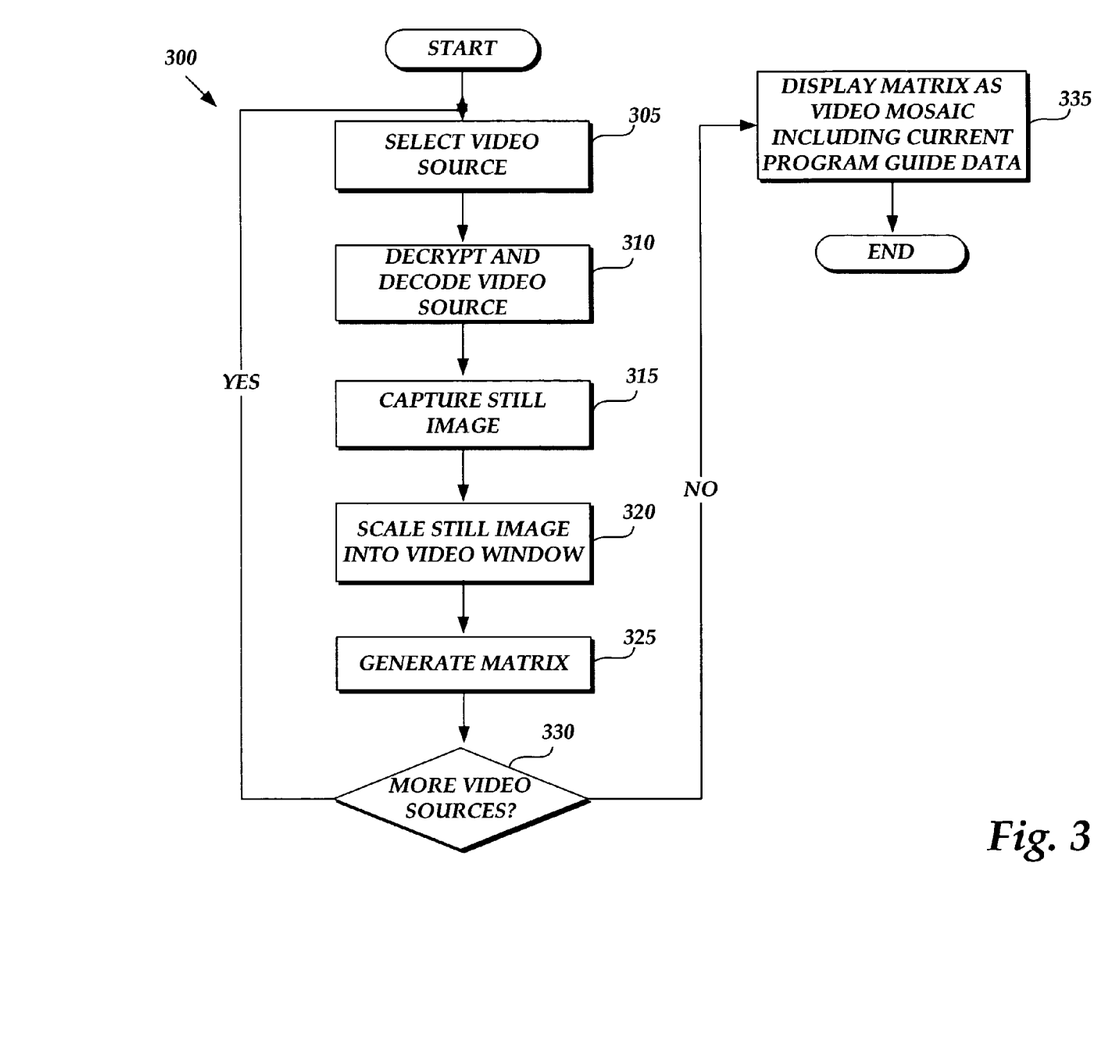
FIG. 3 is a flow diagram showing an illustrative routine for presenting program guide information using a video mosaic of broadcast video sources in the cable services network architecture of FIG. 1, according to an embodiment of the present invention.

Referring now to FIG. 3, an illustrative routine 300 will be described illustrating a process performed by the client applications 125 running on the set-top box 105 for presenting program guide information using a video mosaic of broadcast video sources in the CATV system 100. For purposes of description of the routine illustrated in FIG. 3, consider, for example, that the subscriber profile 200 including a subscriber's video mosaic preferences, is retrieved by the set-top box 105 from the application server 140 upon initialization (or booting) of the set-top box 105 and stored in memory. As understood by those skilled in the art, the set-top box 105 is initialized or booted when first installed, or after an unintentional or intentional loss of power, or when initialization is otherwise required. Alternatively, the routine 300 is also applicable when a previous subscriber profile 200 requires a refresh because of the elapse of a specified amount of time since the last refresh or update of the profile 200. According to this alternative embodiment, after a given amount of time, for example 24 hours, a refresh of a previously prepared subscriber profile 200 is required to account for subscriber data that may have been updated during the elapsed period.

The routine 300 begins at operation 305, wherein the client applications 125 select a video source (e.g., a television program) presently being broadcast on a channel in the CATV system 100. In particular, the client applications 125 instruct a tuner in the set-top box 105 to tune to a channel in the CATV system 100. In particular, in accordance with one embodiment of the invention, the set-top box 105 is a single tuner set-top box and the video source is currently being received by the tuner. In accordance with this embodiment, the video source may be selected during an idle state for the set-top box tuner, such as when the tuner is in an off state or when the tuner is displaying a graphics screen (such as an electronic program guide) so as not to interfere with normal television viewing. According to an alternative embodiment of the invention, the set-top box 105 is a multiple tuner set-top box and the video source is selected from a secondary tuner which is not currently in use (i.e., is not being used to display video content on the television 120). In this embodiment, an idle state for the tuner is not required since the secondary tuner may be used to select the video sources. According to yet another alternative embodiment of the invention, the set-top box 105 is a tunerless set-top box connected to a cable or digital subscriber line ("DSL") modem via an Ethernet connection. In this embodiment, the video source may be selected directly from the server-side head end 110, via the Internet.

The routine 300 then continues from operation 305 at operation 310 where the client applications 125 decrypt and decode the selected video source (if necessary). In particular, the client applications 125 are operative to instruct the set-top box 105 to determine if a selected video source broadcast from the head end 110 is encrypted (e.g., a pay-per-view channel) and decrypt the selected video source to access the content of the video source. Similarly, the client applications 125 are operative to instruct the set-top box 105 to determine if a selected video source broadcast from the head end 110 is encoded according to a compression algorithm (e.g., the Moving Picture Experts Group compression schemes) and decode the selected video source to access the selected video source as a raw data format. Decryption and decoding schemes for broadcast video sources in a cable television services system are known to those skilled in the art.

The routine 300 then continues from operation 310 at operation 315 where the client applications 125 capture a still image from the selected video source. In particular, a video capture is performed on the selected video source signal to extract an image or video still frame and stored in the set-top box 105. Video capture techniques of video signals are known to those skilled in the art. It will be appreciated that in one embodiment, the client applications 125 may further compress the video still according to the Joint Photographic Experts Group ("JPEG") image compression technique. Other image compression techniques may also be utilized. It should be understood that in one embodiment, the still image for a currently tuned channel may be captured from a scaled video window displaying the tuned channel as a picture-in-picture ("PIP") window when a single tuner set-top box 105 is displaying a graphics screen, such as an EPG guide.

The routine 300 then continues from operation 315 at operation 320 where the client applications 125 scale (i.e., decimate) the video still representing the captured video source into a video window. In particular, the size of the video still may be reduced (using known techniques) to a predetermined size such that a matrix of multiple stills may be displayed on a single graphical display to represent the video mosaic.

The routine 300 then continues from operation 320 at operation 325 where the client applications 125 generate a matrix for the video window. In particular, the client applications 125 may be operative to transfer the video window to the graphics plane for presentation as program guide information for the corresponding video source.

The routine 300 then continues from operation 325 at operation 330 where the client applications 125 determine if there are more video sources from which to generate video windows or stills representing the video mosaic. As discussed above, the number of video stills to be included in the mosaic may be based on the predefined filters and/or sub-filters specified by a customer in the subscriber profile 200 of FIG. 2. In particular, the number of video sources comprising a mosaic may include a subset of channels in the CATV system 100 represented in an EPG. If, at operation 330, it is determined that additional video windows need to be generated from other video sources, then the routine 300 repeats operations 305-325 where the matrix is further generated by adding video windows representing additional video sources selected by the client applications 125. If, at operation 330, it is determined that no additional video sources need to be generated, then the routine 300 continues at operation 335.

In accordance with one embodiment of the invention, the additional video sources may be converted into video windows in the application server 140 at the head end 110, and downloaded to the set-top box 105 (using the embedded cable modem) over the extended data channel discussed above with respect to FIG. 1. It will be appreciated that the conversion of the video windows in the application server 140 may include one or more of the operations 310-320 discussed above. In accordance with another embodiment of the invention, additional video windows may be generated as new video sources are tuned during an idle state of a single tuner set-top box as discussed above in operation 305. In accordance with yet another embodiment of the invention, additional video windows may be generated continuously using the secondary tuner in a multiple tuner set-top box as discussed above in operation 305, enabling the matrix to be updated in real-time regardless of the currently tuned video source.

It will be appreciated that, according to one embodiment of the invention, the number of video windows in the matrix may be limited according to the mosaic filter information 270 in the subscriber profile 200. For instance, the client applications 125 may select video sources or channels according to the Favorites filter, the Recent (i.e., recently viewed channels) filter, the VOD filter, or the HDTV filter. It should be understood that the filter applied to the channels tuned by the set-top box 105 may be further limited by one or more sub-filters. For instance, the channels in the Favorites filter may be further limited by a genre such as by the Sports filter or the Movies filter.

At operation 335, the client applications 125 instruct the set-top box 105 to display the generated matrix as a video mosaic including current program guide data. The routine 300 then ends. An illustrative television screen display of a video mosaic in accordance with an embodiment of the invention will be described below with respect to FIG. 4.

Figure 4:
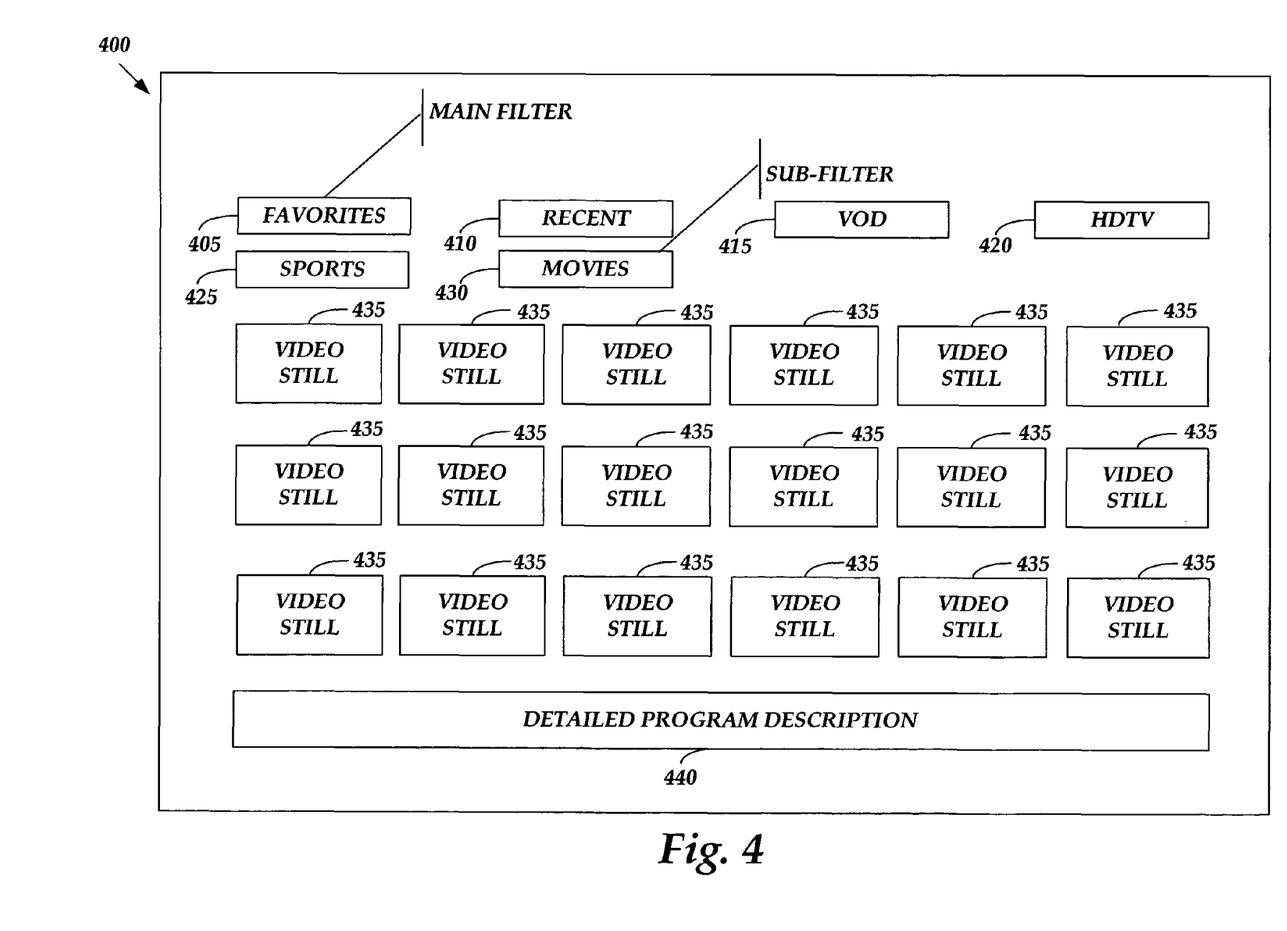
FIG. 4 is a simplified block diagram illustrating a television screen display of a video mosaic for presenting program guide information according to an embodiment of the present invention.

FIG. 4 is a simplified block diagram illustrating a television screen display of a video mosaic for presenting program guide information in accordance with one embodiment of the invention. It should be understood that in one embodiment of the invention, the display 400 is tuned for presentation in a HDTV format. It should be understood that the layout and content of the television screen display illustrated in FIG. 4 is for purposes of example only and is not limiting of the variety of different layouts and types of content that may be included in such displays according to illustrative embodiments of the present invention.

Referring now to FIG. 4, the television screen display 400 includes filter and sub-filter buttons 405-430 for determining the content in the video stills 435 comprising the video mosaic. In particular, the Favorites filter 405 may represent a subscriber's favorite channels, the Recent filter 410 may represent recently viewed channels by the subscriber, the VOD filter 415 may represent VOD channels, and the HDTV filter may represent HDTV channels. The Sports sub-filter 425 and the Movies sub-filters 430 may be associated with any of the aforementioned main filters 405-420 and serve to limit the content of the main filters to these respective genres. It will be appreciated that the content of the display 400 may be changed or updated by selecting one of the filter buttons 405-430. The mosaic display 400 also includes a Detailed Program Description banner 440 for providing a description of a currently tuned program corresponding to one of the video stills 435.

Based on the foregoing, it should be appreciated that the various embodiments of the invention include methods and computer-readable media for presenting program guide information using a mosaic of video sources broadcast in a television services system. An application program executed on a television services set-top box generates a matrix of still images representing multiple video sources presently being broadcast in the television services system. The matrix of still images is presented as a video mosaic representing current program guide information in the television services system. The above specification, examples and data provide a complete description of the manufacture and use of the composition of the invention. Since many embodiments of the invention can be made without departing from the spirit and scope of the invention, the invention resides in the claims hereinafter appended.

I claim:

1. A method of presenting program guide information using a mosaic of video sources broadcast in a television services system, comprising:
   sending a data query from an application server at a headend of a television services system to a web services system to gather customer data;
   processing the data query by the web services system to identify at least one data service from a plurality of data services to retrieve customer data according to the data query;
   accessing by the web services system the identified at least one data service from the plurality of data services to retrieve customer data according to the data query;
   passing the retrieved customer data from the web services system to the application server;
   generating a customer profile at the application server at the headend of the television services system using the retrieved customer data passed from the web services system and subscription information associated with the customer;
   providing a set-top box the generated customer profile and video mosaic preferences of the customer, the video mosaic preferences being provided by mosaic filters defined by parameters specified by a user to filter a plurality of video sources presently being broadcast in the television services system to determine still images representing various television programs broadcast in a television services system included in the video mosaic;
   the set-top box using a client application to form a video mosaic based on the customer profile and the video mosaic preferences of the customer; and
   presenting a program guide page having the video mosaic based on the customer profile and the video mosaic preferences of the customer displayed in the program guide page.

2. The method of claim 1, further comprises generating a matrix further comprises generating the matrix of still images from a subset of the video sources presently being broadcast in the television services system, wherein the matrix of still images generated from the subset of the video sources is formed by combining the filter selected by the user and information obtained from a subscriber profile.

3. The method of claim 1, wherein generating a matrix of still images representing a plurality of video sources presently being broadcast in the television services system comprises:
   (a) retrieving the customer profile associated with the user;
   (b) identifying a user defined mosaic filter selected by the user for determining video sources for the matrix;
   (c) selecting a first video source from the plurality of video sources as a current video source according to the retrieved customer profile and the video mosaic preferences of the customer;
   (d) capturing a still image from the current video source;
   (e) scaling the captured still image from a predetermined presentation size into a video window;

(f) selecting a next video source from the plurality of video sources as the current video source according to the retrieved customer profile and the video mosaic preferences of the customer; and (g) repeating the operations (a)-(f) for each of the plurality of video sources to generate the still images for processing to form the matrix according to the retrieved customer profile and the video mosaic preferences of the customer.

4. The method of claim 3, wherein selecting a first video source from the plurality of video sources as a current video source according to the retrieved customer profile and the video mosaic preferences of the customer comprises:

tuning to a video source according to the retrieved customer profile and the video mosaic preferences of the customer;

determining an idle state for a set-top box tuner in communication with the plurality of video sources; and selecting a video source currently tuned by the set-top box tuner as the current video source during the idle state.

5. The method of claim 4, wherein determining an idle state for a set-top box tuner in communication with the plurality of video sources comprises determining when the tuner is in an off state.

6. The method of claim 4, wherein determining an idle state for a set-top box tuner in communication with the plurality of video sources comprises determining when the set-top box tuner is displaying a graphics screen.

7. The method of claim 4, wherein selecting a next video source from the plurality of video sources as the current video source according to the retrieved customer profile and the video mosaic preferences of the customer comprises:

determining whether a new video source according to the retrieved customer profile and the the video mosaic preferences of the customer is currently tuned by the set-top box tuner; and selecting the new video source as the next video source.

8. The method of claim 3 further comprising:

decrypting each of the plurality of retrieved video sources; and decoding each of the plurality of retrieved video sources.

9. The method of claim 3, wherein selecting a first video source from the plurality of video sources as a current video source according to the retrieved customer profile and the video mosaic preferences of the customer comprises selecting the first video source from a tuner in a multiple tuner set-top box.

10. The method of claim 1 further comprising downloading each video window over an extended data channel in the television services system.

11. A non transitory computer-readable medium, the computer-readable medium tangibly embodying computer-executable instructions which, when executed on a computer, cause the computer to perform a method of presenting program guide information using a mosaic of video sources broadcast in a television services system, the method comprising:

sending a data query from an application server at a headend of a television services system to a web services system to gather customer data;

processing the data query by the web services system to identify at least one data service from a plurality of data services to retrieve customer data according to the data query;

accessing by the web services system the identified at least one data service from the plurality of data services to retrieve customer data according to the data query;

passing the retrieved customer data from the web services system to the application server;

generating a customer profile at the application server at the headend of the television services system using the retrieved customer data passed from the web services system and subscription information associated with the customer;

providing a set-top box the generated customer profile and video mosaic preferences of the customer, the video mosaic preferences being provided by mosaic filters defined by parameters specified by a user to filter a plurality of video sources presently being broadcast in the television services system to determine still images representing various television programs broadcast in a television services system included in the video mosaic;

the set-top box using a client application to form a video mosaic based on the customer profile and the video mosaic preferences of the customer; and presenting a program guide page having the video mosaic based on the customer profile and the video mosaic preferences of the customer displayed in the program guide page.

12. The computer-readable medium of claim 11, further comprises generating a matrix of still images representing a plurality of video sources presently being broadcast in the television services system comprising:

(a) retrieving the customer profile associated with the user;

(b) identifying a user defined mosaic filter selected by the user for determining video sources for the matrix;

(c) selecting a first video source from the plurality of video sources as a current video source according to the retrieved customer profile and the video mosaic preferences of the customer;

(d) capturing a still image from the current video source;

(e) scaling the captured still image from a predetermined presentation size into a video window;

(f) selecting a next video source from the plurality of video sources as the current video source according to the retrieved customer profile and the video mosaic preferences of the customer;

(g) repeating the operations (a)-(f) for each of the plurality of video sources to generate a set of still images for processing to form the matrix of still images according to the retrieved customer profile and the video mosaic preferences of the customer; and (h) processing the set of still images to form the matrix by displaying only a subset of the set of still images chosen according to the video mosaic preferences of the customer.

13. The computer-readable medium of claim 12, wherein selecting a first video source from the plurality of video sources as a current video source according to the retrieved customer profile and the video mosaic preferences of the customer comprises:

tuning to a video source according to the retrieved customer profile and the video mosaic preferences of the customer;

determining an idle state for a set-top box tuner in communication with the plurality of video sources; and selecting a video source currently tuned by the set-top box tuner as the current video source during the idle state.

14. The computer-readable medium of claim 13, wherein determining an idle state for a set-top box tuner in communication with the plurality of video sources comprises determining when the tuner is in an off state.

15. The computer-readable medium of claim 13, wherein determining an idle state for a set-top box tuner in communication with the plurality of video sources comprises determining when the set-top box tuner is displaying a graphics screen.

16. The computer-readable medium of claim 13, wherein selecting a next video source from the plurality of video sources as the current video source according to the retrieved customer profile and the video mosaic preferences of the customer comprises:
   determining whether a new video source according to the retrieved customer profile and the video mosaic preferences of the customer is currently tuned by the set-top box tuner; and
   selecting the new video source as the next video source.

17. The computer-readable medium of claim 12 further comprising:
   decrypting each of the plurality of retrieved video sources; and
   decoding each of the plurality of retrieved video sources.

18. The computer-readable medium of claim 12, wherein selecting a first video source from the plurality of video sources as a current video source according to the retrieved customer profile and the video mosaic preferences of the customer comprises selecting the first video source from a tuner in a multiple tuner set-top box.

19. The computer-readable medium of claim 11, further comprising downloading each video window over an extended data channel in the television services system.

20. A method of presenting personalized program guide information using a mosaic of video sources broadcast in a television services system, comprising:
   (a) sending a data query from an application server at a headend of a television services system to a web services system to gather customer data;
   (b) processing the data query by the web services system to identify at least one data service from a plurality of data services to retrieve customer data according to the data query;
   (c) accessing by the web services system the identified at least one data service from the plurality of data services to retrieve customer data according to the data query;
   (d) passing the retrieved customer data from the web services system to the application server;
   (e) generating a customer profile at the application server at the headend of the television services system using the retrieved customer data passed from the web services system and subscription information associated with the customer;
   (f) providing a set-top box the generated customer profile and video mosaic preferences of the customer, the video mosaic preferences being provided by mosaic filters defined by parameters specified by a user to filter a plurality of video sources presently being broadcast in the television services system to determine still images representing various television programs broadcast in the CATV system included in the video mosaic;
   (g) the set-top box using a client application to form a video mosaic based on the customer profile and the video mosaic preferences of the customer; and
   (h) presenting a program guide page having the video mosaic based on the customer profile and the video mosaic preferences of the customer displayed in the program guide page;
   (i) selecting a first video source from a plurality of video sources as a current video source according to the retrieved customer profile and the video mosaic preferences of the customer;
   (j) capturing a still image from the current video source;
   (k) scaling the captured still image from a predetermined presentation size into a video window;
   (l) selecting a next video source from the plurality of video sources as the current video source according to the retrieved customer profile and the video mosaic preferences of the customer;
   (m) repeating the operations (a)-(l) for each of the plurality of video sources to generate the still images for processing to form the matrix of still images by displaying only still images according to the retrieved customer profile and the video mosaic preferences of the customer; and
   (n) presenting the matrix of still images as the video mosaic within the program guide page.

\* \* \* \* \*

UNITED STATES PATENT AND TRADEMARK OFFICE
CERTIFICATE OF CORRECTION

| | | |
|---|---|---|
| PATENT NO. | : 8,132,208 B2 | Page 1 of 1 |
| APPLICATION NO. | : 11/704696 | |
| DATED | : March 6, 2012 | |
| INVENTOR(S) | : Gonzalez | |

It is certified that error appears in the above-identified patent and that said Letters Patent is hereby corrected as shown below:

Col. 10, lines 38-39, claim 1: "in a television services system" should read --in the television services system--

Col. 10, line 48, claim 2: delete "further comprises generating the matrix"

Col. 12, lines 14-15, claim 11: "in a television services system" should read --in the television services system--

Col. 14, line 14, claim 20: "the CATV system" should read --the television services system--

Signed and Sealed this
Twentieth Day of November, 2012

David J. Kappos
*Director of the United States Patent and Trademark Office*